May 12, 1925. 1,537,247
A. MALLOY
COMBINED TIRE HOLDER AND TOOL BOX
Filed Dec. 30, 1918
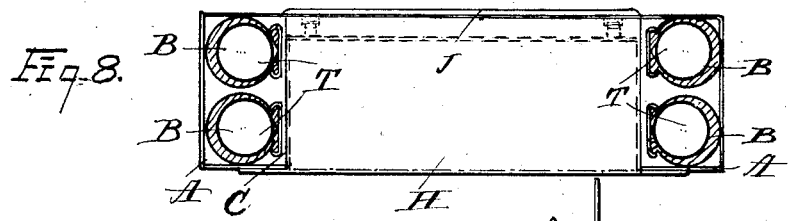
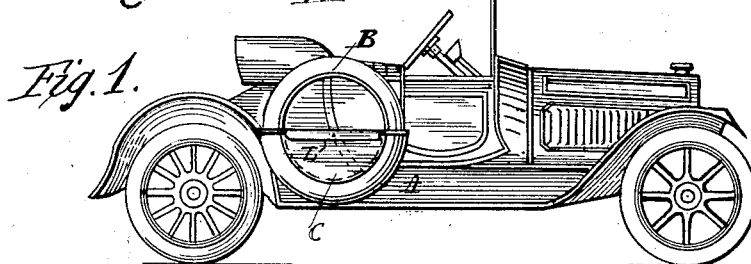
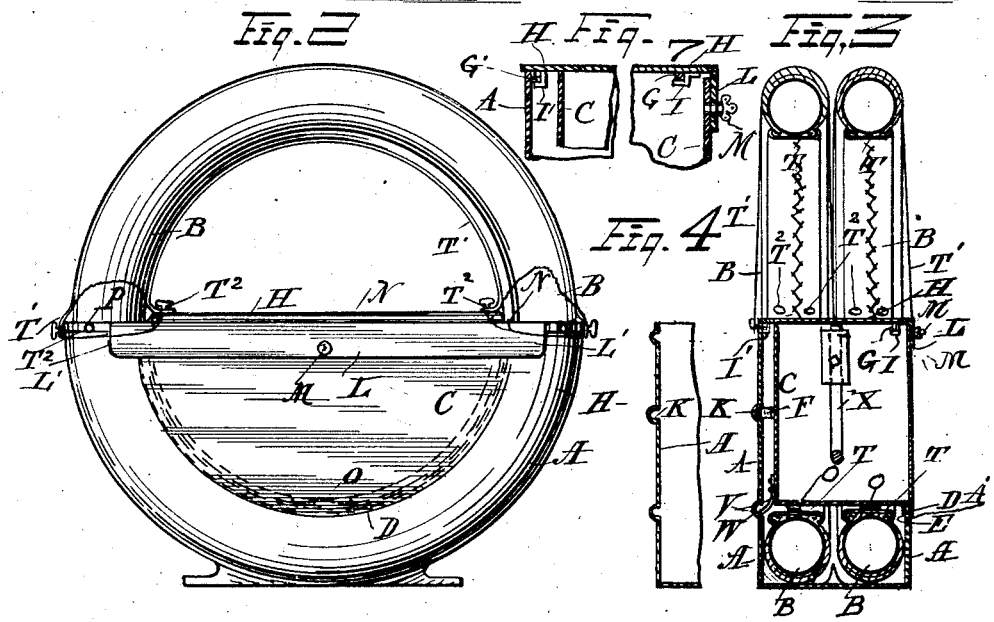
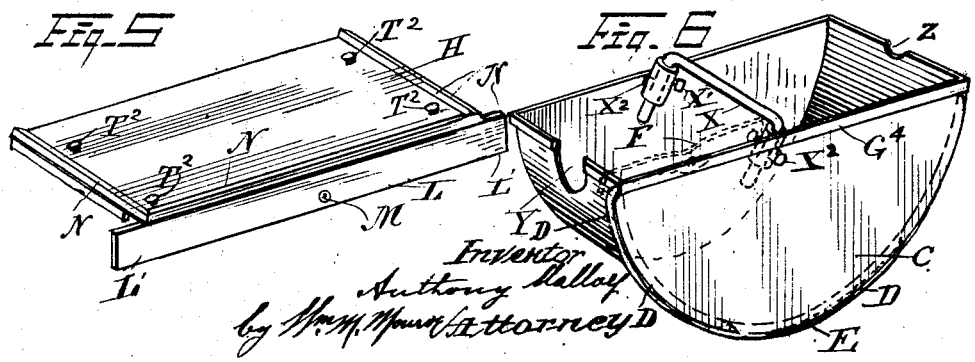

Patented May 12, 1925.

1,537,247

UNITED STATES PATENT OFFICE.

ANTHONY MALLOY, OF CLEVELAND, OHIO.

COMBINED TIRE HOLDER AND TOOL BOX.

Application filed December 30, 1918. Serial No. 268,848.

*To all whom it may concern:*

Be it known that I, ANTHONY MALLOY, a citizen of the United States, and resident of Cleveland, in the county of Cuyahoga and State of Ohio, have invented certain new and useful Improvements in Combined Tire Holders and Tool Boxes, of which I hereby declare the following to be a full, clear, and exact description, such as will enable others skilled in the art to which it appertains to make and use the same.

The objects of the invention are to provide a simple, efficient and practical form of combined tire holder and tool box for use when traveling in an automobile, and in which the tool box can be dropped into its seat in the tire holder from above and in this manner is more secure in its seat and cannot be dislodged when the machine travels over rough roads.

The invention includes means for preventing the tool box from rattling upon its seat, and also includes a particular form of cover for the tool box and means for attaching the cover and interlocking the cover with the tool box and tire holder to prevent accidental dislodgment. The invention comprises the construction and combination and arrangement of the various parts hereinafter described, shown in the accompanying drawings and particularly pointed out in the claims.

In the accompanying drawings Fig. 1 is a side elevation of an automobile on which the device is mounted;

Fig. 2 is an enlarged side elevation of the device;

Fig. 3 is a central transverse section of the device;

Fig. 4 is a vertical section of the rear wall of the tool box showing grooves formed therein for purposes hereinafter described;

Fig. 5 is a perspective of the cover;

Fig. 6 is a perspective of the tool box;

Fig. 7 is a vertical transverse section, enlarged, of the cover and upper edges of the front and rear walls of the tool box. Fig. 8 is a plan of the device showing the tires in cross-section.

In these views, A represents the tire holder which is of a semi-circular trough shape, open above and is provided with a semi-circular opening in its front wall, into which the tire or tires, B, B, are inserted from above.

This tire holder can be attached to the running board of the machine, or placed externally on the machine wherever desired.

C is the tool box which is inserted in the tire holder from above and fills the central semi-circular opening in the front wall of the tire holder after the tires are in place. The lower front edge of the tool box is provided with parallel vertical spaced flanges D and E respectively, which ride upon the upper edge of the front wall of the case at A' and prevent it from slipping out.

The rear edge of the tool box is provided with a downwardly extending spring V, which engages a recess or shoulder W in the rear wall of the tire holder, and supports the rear wall of the tool box, but is so arranged as to readily permit withdrawing the tool box. A spring F on the rear wall of the tool box enters a groove K in the rear wall of the tire holder, and prevents the box from rattling. Also springs O, O on the bottom wall of the tool box are preferably used to engage the metallic rims T, T of the tires to prevent the tool box from rattling.

A cover H is applied to the top of the tool box by sliding it thereover from the front to the rear, and rearwardly directed lugs I, I' on the cover engage the projections G and G'. The lugs I and I' extend from the cover and the lug G extends from the end wall of the tool box and the lug G' extends from the rear wall of the tire holder. A flange L on the front edge of the cover is turned downwardly over the front edge of the tool box and is extended longitudinally at each end at L' to reinforce the edge of the cover and to exclude moisture.

The flange D at the lower front edge of the tool box has a similar effect. A lock M secures the cover in place and after locking the cover the tool box cannot be lifted off from the tire holder on account of the locking projections or lugs I, I', on the cover, which lie underneath the projections G, G' when the cover is closed. The tool box cannot be removed by pulling forward, on account of the vertical flanges D and E.

A device for pressing down upon and retaining the tools in the tool box is shown in Fig. 6. Here a crank shaped or curved spring bar X is shown pivoted in the walls of the tool box and revolvable therein. This crank-shaped bar is adjustably secured in sockets, X', which are pivoted at $X^2$ in the front and rear walls of the tool box, C. This can be pressed down upon the tools to prevent them from rattling; openings Y and Z in the end walls of the tool box can be made when the tool box is small, to receive the extremities of the air pump.

A water proof cover T' can be placed over the tires and buttoned to the tire holder at T² and to the top of the cover H at T² to exclude moisture. The cover is preferably provided with a marginal rib N, at the front and end edges which turns the water when it rains, towards the rear edge of the box which is the direction in which it will naturally run, when the tire holder is placed on the left side of the machine or is mounted behind. The upper edge of the front wall of the tool box is also preferably reinforced at G⁴.

Having described the invention what I claim as new and desire to secure by Letters Patent is—

1. In a combination tire carrier and tool box, a semicircular trough shaped casing open at the top and provided with a semicircular opening in its front wall and having a continuous rear wall, a semicircular tool box insertable in said opening, a rest for the lower end of said tool box in said rear wall of said casing, means for interlocking the said lower edge of said tool box with the front edge of said casing, a cover for said tool box, means for interlocking the rear edge of said cover with the rear wall of said casing and means for interlocking the ends of said cover with the ends of said tool box.

2. In a combination tire carrier and tool box, a semicircular trough shaped casing provided with a semicircular opening in its front wall, a semicircular tool box insertable in said casing, a support for the lower rear edge of said tool box on the rear wall of said casing, parallel flanges turned downwardly from the lower front edge of said tool box, said flanges engaging the upper edge of the front wall of said casing, a cover for said tool box, said cover provided with rearwardly extending members interlocking with the upper edge of the rear wall of said casing, the front edge of said cover being turned downwardly to overlap the front edge of said tool box, and means for locking said downwardly turned edge to the front wall of said tool box.

3. In a combined tire carrier and tool box, a semicircular trough shaped casing having a continuous rear wall and a front wall provided with a semicircular opening, a semicircular tool box insertable in said semicircular opening and open at the top, means for interlocking the lower front edge of said tool box with the upper edge of the front wall of said casing, said interlocking means including moisture excluding means supporting means on the rear wall of said tool box, a cover for said tool box slidingly movable thereover, interengaging means on said cover and on the rear wall of said casing and on the end wall of said tool box, and a depending flange upon the front of said cover, said flange extended longitudinally to reenforce the same and exclude moisture, and a marginal rib upon the upper face of said cover extending across the ends and front thereof.

In testimony whereof, I hereunto set my hand this 29th day of October 1918.

ANTHONY MALLOY.

In presence of—
R. B. JEREMIAH,
WM. M. MONROE.